United States Patent
Yasuda

(10) Patent No.: US 11,087,510 B2
(45) Date of Patent: Aug. 10, 2021

(54) IMAGE PROCESSING METHOD AND IMAGE PROCESSOR

(71) Applicant: SCREEN HOLDINGS CO., LTD., Kyoto (JP)

(72) Inventor: Takuya Yasuda, Kyoto (JP)

(73) Assignee: SCREEN HOLDINGS CO., LTD., Kyoto (JP)

(*) Notice: Subject to any disclaimer, the term of this patent is extended or adjusted under 35 U.S.C. 154(b) by 12 days.

(21) Appl. No.: 16/487,027

(22) PCT Filed: Nov. 22, 2017

(86) PCT No.: PCT/JP2017/041911
§ 371 (c)(1),
(2) Date: Aug. 19, 2019

(87) PCT Pub. No.: WO2018/173365
PCT Pub. Date: Sep. 27, 2018

(65) Prior Publication Data
US 2020/0234473 A1    Jul. 23, 2020

(30) Foreign Application Priority Data
Mar. 24, 2017    (JP) .............................. JP2017-058514

(51) Int. Cl.
G06T 11/20    (2006.01)
G06T 7/12    (2017.01)
(Continued)

(52) U.S. Cl.
CPC .............. G06T 11/203 (2013.01); G06T 7/12 (2017.01); G06T 7/13 (2017.01); G06T 11/60 (2013.01);
(Continued)

(58) Field of Classification Search
CPC . G06T 11/203; G06T 7/12; G06T 7/13; G06T 11/60; G06T 2207/20061;
(Continued)

(56) References Cited

U.S. PATENT DOCUMENTS 6,868,175 B1 * 3/2005 Yamamoto ............... G06K 9/00
382/143
8,508,588 B2   8/2013 Bello et al.
(Continued)

FOREIGN PATENT DOCUMENTS

CN    101389960 A    3/2009
JP    2002-296761 A    10/2002
(Continued)

OTHER PUBLICATIONS

Zhang et al. "Automatic Optical Defect Inspection and Dimension Measurement of Drill Bit." International Conference on Mechatronics and Automation, Jun. 25, 2006, pp. 95-100 (Year: 2006).*

(Continued)

Primary Examiner — Jon Chang
(74) Attorney, Agent, or Firm — McDermott Will & Emery LLP

(57) ABSTRACT

Side coordinate groups that correspond to the four sides of the well are extracted from the edge coordinate group. Approximate lines are generated from the side coordinate groups. Corner coordinate groups that correspond to the four corners of the well are extracted from the edge coordinate group. Two intersecting approximate lines are selected from the approximate lines, and a contact candidate coordinates is set on each of the two approximate lines. Every possible pair of one contact candidate coordinate on one of the two approximate lines and one contact candidate coordinates set on the other approximate line are generated. For the generated pairs, processing for calculating an approximate curve (Continued)

by polynomial approximation from the corner coordinate group is performed, the approximate curve being in contact with two contact candidate coordinates. An approximate curve that is closest to the corner coordinate group is selected from all the calculated approximate curves.

7 Claims, 10 Drawing Sheets

(51) Int. Cl.
*G06T 7/13* (2017.01)
*G06K 9/46* (2006.01)
*G06T 11/60* (2006.01)
*G01N 21/64* (2006.01)

(52) U.S. Cl.
CPC ....... *G01N 21/6452* (2013.01); *G06K 9/4604* (2013.01); *G06T 2207/20061* (2013.01); *G06T 2207/30072* (2013.01)

(58) Field of Classification Search
CPC .......... G06T 2207/30072; G06T 7/181; G06K 9/4604; G01N 21/6452
See application file for complete search history.

(56) References Cited

U.S. PATENT DOCUMENTS

| 2005/0069192 | A1* | 3/2005 | Roman | G06T 7/12 |
| | | | | 382/145 |
| 2005/0180631 | A1* | 8/2005 | Zhang | G06T 5/50 |
| | | | | 382/173 |
| 2005/0265713 | A1* | 12/2005 | Matsuda | H04N 9/3185 |
| | | | | 396/429 |
| 2007/0202538 | A1 | 8/2007 | Glezer et al. | |
| 2009/0225180 | A1 | 9/2009 | Maruyama et al. | |
| 2011/0199370 | A1 | 8/2011 | Chiang et al. | |
| 2011/0285837 | A1 | 11/2011 | Bello et al. | |
| 2016/0177619 | A1 | 6/2016 | Aykas | |
| 2016/0300322 | A1* | 10/2016 | Bedi | G06T 3/0012 |
| 2017/0160869 | A1* | 6/2017 | Tang | G06T 7/90 |

FOREIGN PATENT DOCUMENTS

| JP | 2006-107018 A | 4/2006 |
| JP | 2009-521686 A | 6/2009 |
| JP | 2009-300125 A | 12/2009 |
| JP | 2013-526717 A | 6/2013 |
| JP | 5920994 B2 | 5/2016 |
| TW | I393071 B | 4/2013 |

OTHER PUBLICATIONS

International Search Report issued in corresponding International Patent Application No. PCT/JP2017/041911, dated Feb. 27, 2018, with English Translation.
Taiwanese Office Action issued in corresponding Taiwanese Patent Application No. 106142835, dated Oct. 30, 2018.
Fitting Rectangle available at https://www.inf.ethz.ch/personal/arbenz/MatlabKurs/node88.html, Sep. 24, 2008.
Interpolation of two-dimensional curves with Euler spirals, Journal of Computational and Applied Mathematics 261 (2014) 320-332, 2013.
Curve Fitting and Parameter Estimation available at http://www.math.tamu.edu/~glahodny/Math442/Curve%20Fitting.pdf, (2015).
Richard C. Wilson: "A Coupled Relaxation Method for Finding Perceptual Structures", In: "12th European Conference on Computer Vision, ECCV 2012", Jan. 1, 2004 (Jan. 1, 2004), vol. 3138, pp. 224-232.
Extended European Search Report issued in corresponding European Patent Application No. 17902012.8-1210, dated Jul. 15, 2020.

* cited by examiner

IMAGE PROCESSING METHOD AND IMAGE PROCESSOR

CROSS REFERENCE

This application is the U.S. National Phase under 35 U.S.C. § 371 of International Application No. PCT/JP2017/041911, filed on Nov. 22, 2017, which claims the benefits of Japanese Application No. 2017-058514, filed on Mar. 24, 2017, the entire contents of which are hereby incorporated by reference.

TECHNICAL FIELD

The present invention relates to an image processing method and an image processor in which the edge (e.g., contour or line) of an analysis region where an object is analyzed is detected from image data obtained by capturing an image of the analysis region and surroundings of the analysis region.

BACKGROUND ART

Analyses on biological cells use a flat plate-like container with a plurality of wells (depressions), called a well plate or a microplate. The cells serving as targets for analysis are held together with a culture solution in the plurality of wells. Then, images of the cells are captured with a camera and analyzed. In the image capture with the camera, each well and its surroundings are captured. Thus, it is necessary to accurately detect the boundary of a well wall that defines the range of analysis of cells during image processing.

Patent Literature 1 discloses a method of identifying the wall boundary of a test well in a microplate. According to the method disclosed in Patent Literature 1, features of the wall boundary of a test well are detected from an image of the microplate. Then, the features of the wall boundary are used to generate a candidate edge image of the wall boundary. Through analysis of this candidate edge image, the spatial location of the outer perimeter boundary of the test well is calculated, and that information is used to determine the inner perimeter boundary. This inner perimeter boundary is assumed to be a test well region.

CITATION LIST

Patent Literature

Patent Literature 1: Japanese Patent No. 5920994

SUMMARY OF INVENTION

Technical Problem

In Patent Literature 1, the edge of a circular or rectangular well is detected. There are, however, various shapes of wells. For example, a well may have a rectangular shape with rounded corners. In the case of detecting the edge of a well with such a shape, it is necessary to detect the edge of a linear portion of each side of the well and the edge of a curved portion of each corner. It is, however, noted that wells are commonly molded of a resin. Thus, depending on the precision of molding, linear portions may be rounded, or adjacent linear portions may not become orthogonal to each other. This may result in each corner having a different sized rounded shape or a different shape. The edge of such a distorted well cannot be detected with the method disclosed in Patent Literature 1. If an erroneous test well region is detected, in some cases accurate analysis of the cells is not possible.

The present invention has been made in view of such circumstances, and it is an object of the present invention to provide an image processing method and an image processor that enable accurate detection of an analysis region having the shape of a rounded-corner rectangle.

Solution to Problem

To solve the above-described problem, a first aspect of the present invention is an image processing method of detecting an edge of an analysis region where an object is analyzed and that has a rectangular shape with rounded corners from image data obtained by capturing an image of the analysis region and surroundings of the analysis region. The method includes the steps of a) extracting an edge coordinate group for the analysis region from the image data, b) performing processing for extracting, from the edge coordinate group, a side coordinate group that corresponds to one side of the analysis region for each of four sides of the analysis region, c) generating four approximate lines respectively from the four side coordinate groups, d) performing processing for extracting, from the edge coordinate group, a corner coordinate group that corresponds to one corner of the analysis region for each of four corners of the analysis region, e) selecting a first approximate line and a second approximate line that intersect with each other from among the four approximate lines, f) setting a plurality of contact candidate coordinates for each of the first approximate line and the second approximate line, g) generating an approximate curve by polynomial approximation from one of the corner coordinate groups that is closest to an intersection point of the first approximate line and the second approximate line, the approximate curve being in contact with at least one or more pairs of one contact candidate coordinates set on the first approximate line and one contact candidate coordinates set on the second approximate line, and h) selecting an approximate curve that is closest to the corner coordinate group used in the step g) from among the approximate curves generated in the step g). The steps e) to h) are performed for every possible combination of the four approximate lines.

A second aspect of the present invention is the image processing method according to the first aspect, in which in the step g), every possible pair of the contact candidate coordinates set in the step f) is used to generate the approximate curves.

A third aspect of the present invention is the image processing method according to the first or second aspect, in which in the step d), the corner coordinate group is extracted based on a distance from an intersection point of two intersecting ones of the approximate lines.

A fourth aspect of the present invention is the image processing method according to the first to third aspects, in which in the step c), polynomial approximation using a least-square method is used to generate the approximate lines.

A fifth aspect of the present invention is the image processing method according to the first to fourth aspects, in which the approximate lines are approximate straight lines.

A sixth aspect of the present invention is the image processing method according to the first to fifth aspects, in which the approximate curves are spline curves.

A seventh aspect of the present invention is an image processor that includes a camera that captures an image of an analysis region and surroundings of the analysis region, the analysis region being where an object is analyzed and having a rectangular shape with rounded corners, and a controller that detects an edge of the analysis region from image data obtained by image capture with the camera. The controller executes the steps of a) extracting an edge coordinate group for the analysis region from the image data, b) performing processing for extracting, from the edge coordinate group, a side coordinate group that corresponds to one side of the analysis region for each of four sides of the analysis region, c) generating four approximate lines respectively from the four side coordinate groups, d) performing processing for extracting, from the edge coordinate group, a corner coordinate group that corresponds to one corner of the analysis region for each of four corners of the analysis region, e) selecting a first approximate line and a second approximate line that intersect with each other from the four approximate lines, f) setting a plurality of contact candidate coordinates on each of the first approximate line and the second approximate line, g) calculating an approximate curve by polynomial approximation from one of the corner coordinate groups that is closest to an intersection point of the first approximate line and the second approximate line, the approximate curve being in contact with at least one or more pairs of one contact candidate coordinates set on the first approximate line and one contact candidate coordinates set on the second approximate line, and h) selecting an approximate curve that is closest to the corner coordinate group used in the step g) from among the approximate curves generated in the step g). The steps e) to h) are performed for every possible combination of the four approximate lines.

Advantageous Effects of Invention

According to the first to seventh aspects of the present invention, the edge of the analysis region is represented by a combination of the approximate lines of each side of a rectangle and the approximate curves of each corner generated using the approximate lines. The edge coordinate groups for the corners may not be extracted accurately from image data, as compared with those for the sides. In that case, the edges of the corners cannot be detected accurately. However, according to the present invention, the accuracy in detecting the edges of the corners can be improved by generating the approximate curves of the corners from the approximate lines of each side of the rectangle. This improves the accuracy of edge detection of the corners. Thus, the edge of the analysis region can be detected accurately. By grasping the edge of the analysis region, it is possible to accurately analyze an object.

DESCRIPTION OF EMBODIMENTS

Preferred embodiments of the present invention will be described hereinafter with reference to the drawings. In the following description, an "image processor" according to the present invention is described as an image capturing device that captures images of a well plate that has been set. Then, an "image processing method" according to the present invention is described as being executed by this image capturing device.

1. Configuration of Image Capturing Device

Figure 1:
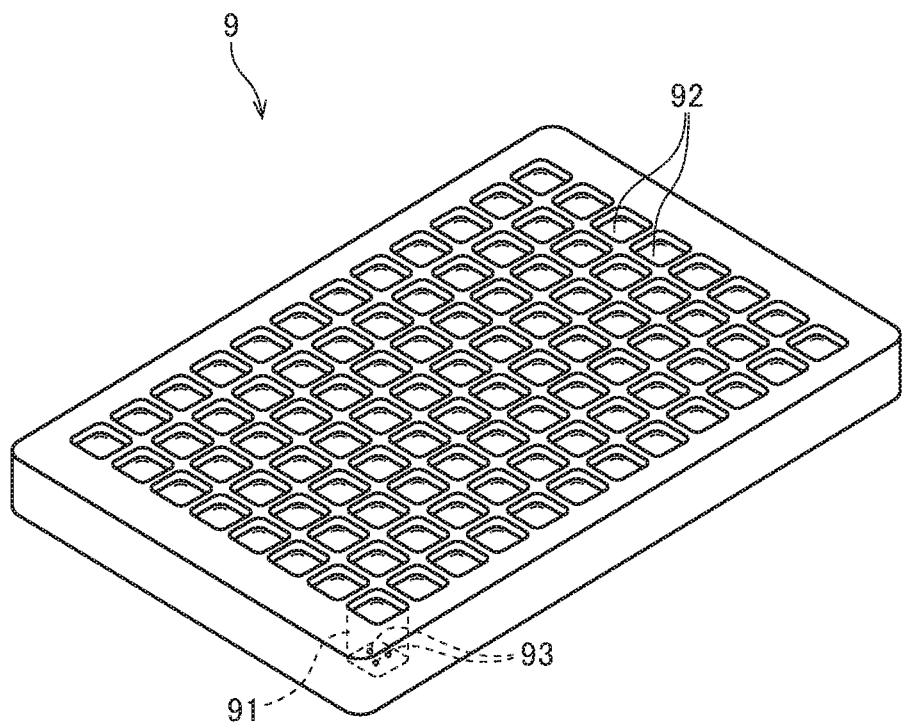
FIG. 1 is a perspective view illustrating an example of a well plate that is set in an image capturing device.

FIG. 1 is a perspective view illustrating an example of a well plate 9 that is set in an image capturing device 1.

The well plate 9 is a generally plate-like specimen container with a plurality of wells 91. The material for the well plate 9 is, for example, a transparent resin that transmits light. The plurality of wells 91 is arranged regularly in the upper surface of the well plate 9. The wells 91 hold a plurality of cells 93 serving as targets for analysis, together with a culture solution 92. The insides of the wells 91 are analysis regions where the cells 93 are analyzed. The wells 91 have the shape of a rounded-corner rectangle when viewed from above. The rounded-corner rectangle is approximately a square with four rounded corners.

Figure 2:
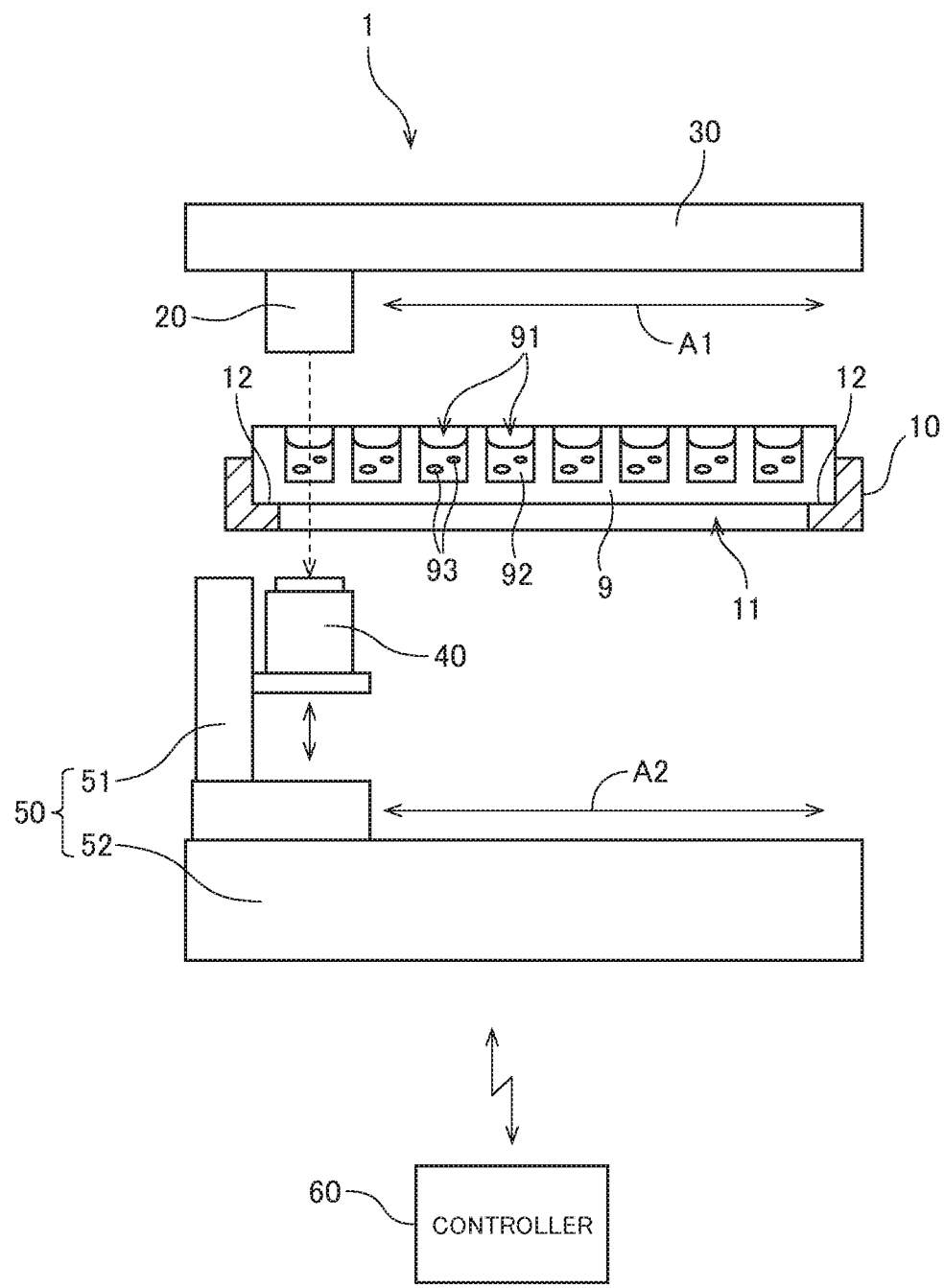
FIG. 2 illustrates a configuration of the image capturing device.

FIG. 2 illustrates a configuration of the image capturing device 1 according to the present embodiment.

The image capturing device 1 is configured to capture images of the plurality of cells 93 in the well plate 9 a plurality of times while changing the focal position of a camera 40 so as to generate image data of the cells 93. The image capturing device 1 is used in, for example, a screening process of narrowing down chemical compounds serving as candidates for pharmaceuticals in the field of research and development of pharmaceuticals. In the screening process, a person in charge adds chemical compounds having different concentrations or compositions to the plurality of wells 91 in the well plate 9. Then, the image capturing device 1 acquires image data of cells 93 in each well 91 in the well plate 91. Thereafter, culture conditions of the cells 93 are compared and analyzed on the basis of the acquired image data so as to verify the effects of the chemical compounds added to the culture solution 92.

The image capturing device 1 may also be used in research and development of pluripotent stem cells such as IPS cells or ES cells to observe cell differentiation, for example.

The image capturing device 1 includes a stage 10, a projector 20, a projector moving mechanism 30, the camera 40, a camera moving mechanism 50, and a controller 60.

The stage 10 is a pedestal that holds the well plate 9. The position of the stage 10 in the image capturing device 1 is fixed at least during image capture. The stage 10 has a rectangular opening 11 penetrating in the up-down direction in the center. The stage 10 also has an annular supporting surface 12 at the edge of the opening 11. The well plate 9 is fitted in the opening 11 and horizontally supported by the supporting surface 12. The top and bottom of each well 91 are thus exposed without being blocked by the stage 10.

The projector 20 is disposed above the well plate 9 held on the stage 10. The projector 20 has a light source such as LEDs. The light source in the projector 20 emits light during image capture. Thus, light is emitted downward from the projector 20. Note that the projector 20 only needs to emit light toward the well plate 9 from the side opposite to the camera 40. Thus, the projector 20 may be configured such that its light source itself is disposed at a position off the top of the well plate 9, and light is applied to the well plate 9 via an optical system such as a mirror.

The projector moving mechanism 30 is a mechanism for moving the projector 20 horizontally along the upper surface of the well plate 9 held on the stage 10. For example, the projector moving mechanism 30 is a mechanism for converting rotational motion of a motor into rectilinear motion via a ball screw. The image capturing device 1 can dispose the projector 20 at a position above each well 91 by operating the projector moving mechanism 30. In FIG. 2, only one direction indicated by an arrow A1 is illustrated as the direction of movement of the projector 20. However, the projector moving mechanism 30 may be configured to move the projector 20 in two directions (left-right and depth directions in FIG. 2) along the upper surface of the well plate 9.

The camera 40 is disposed below the well plate 9 held on the stage 10. The camera 40 includes an optical system such as a lens and an image sensor such as a CCD or a CMOS. During image capture, the camera 40 captures an image of part of the well plate 9 while the projector 20 applies light toward that part of the well plate 9. Accordingly, images of the cells 93 in the well plate 9 can be acquired in the form of digital data. The captured image is input from the camera 40 to the controller 60.

The camera moving mechanism 50 is a mechanism for changing the height and horizontal position of the camera 40 while maintaining the posture of the camera 40. The camera moving mechanism 50 includes an up-and-down movement mechanism 51 and a horizontal movement mechanism 52.

The up-and-down movement mechanism 51 changes the height of the camera 40 by moving the camera 40 up and down. This changes the distance between the camera 40 and the well plate 9 held on the stage 10 (i.e., shooting distance between the cells 93 and the camera 40). As a result, it is possible to move the focal position of the camera 40 up and down along the optical axis.

The horizontal movement mechanism 52 moves the camera 40 and the up-and-down movement mechanism 51 horizontally as an integral unit. By operating the horizontal movement mechanism 52, the image capturing device 1 can dispose the camera 40 at a position under each well 91. Note that in FIG. 2, only one direction indicated by an arrow A2 is illustrated as the direction of movement of the camera 40 caused by the horizontal movement mechanism 52. However, the camera moving mechanism 50 may be configured to move the camera 40 in two directions (left-right and depth directions in FIG. 2) along the lower surface of the well plate 9.

The projector moving mechanism 30 and the horizontal movement mechanism 52 described above are driven in synchronization. Accordingly, the projector 20 and the camera 40 are always disposed at the same position when viewed from above. That is, the projector 20 and the camera 40 move the same distance in the same direction, and when the camera 40 is disposed at a position under a given well 91, the projector 20 is always disposed at a position above that well 91.

Figure 3:
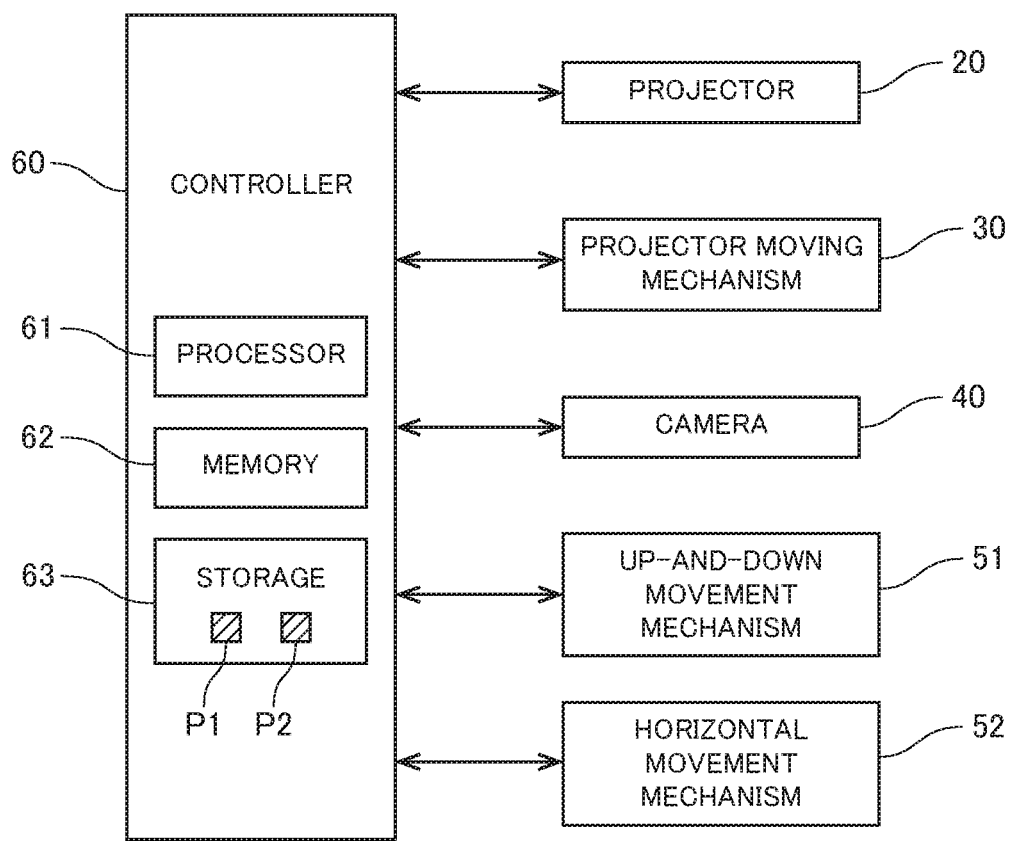
FIG. 3 is a block diagram illustrating connection between a controller and each part of the image capturing device.

The controller 60 is configured by, for example, a computer. The controller 60 has the function of controlling the operation of each part of the image capturing device 1 and the function of performing image processing on the image data acquired by the image capture with the camera 40. FIG. 3 is a block diagram illustrating connection between the controller 60 and each part of the image capturing device 1. As schematically illustrated in FIG. 3, the controller 60 includes a processor 61 such as a CPU, a memory 62 such as a RAM, and a storage 63 such as a hard disk drive. The storage 63 stores a program P1 for controlling the operation of each part of the image capturing device 1, and a program P2 for performing image processing on the image data.

Also, the controller 60 is communicably connected to each of the projector 20, the projector moving mechanism 30, the camera 40, the up-and-down movement mechanism 51, and the horizontal movement mechanism 52, which are described above. The controller 60 controls the operation of each part described above in accordance with the program P1. Accordingly, processing for capturing an image of the cells 93 held in each well 91 of the well plate 9 proceeds. The controller 60 also processes image data that is input from the camera 40, in accordance with the program P2 so as to detect the edge of the well 91 or to acquire image data of the cells 93 in the well 91. The edge of the well 91 refers to the boundary between the inner wall of the well 91 and its surroundings in the well plate 9.

2. Image Processing

In the case of capturing images of the well plate 9, each well 91 and its surrounding are captured. Thus, in the case of acquiring image data of the cells 93 in each well 91, it is necessary to first detect the edge of the well 91 in the well plate 9. The image capturing device 1 performs processing for detecting the edge of each well 91 from the image data acquired by image capture of the well plate 9 (this processing is hereinafter referred to as "edge detection processing"). Hereinafter, the edge detection processing will be described.

Figure 4:
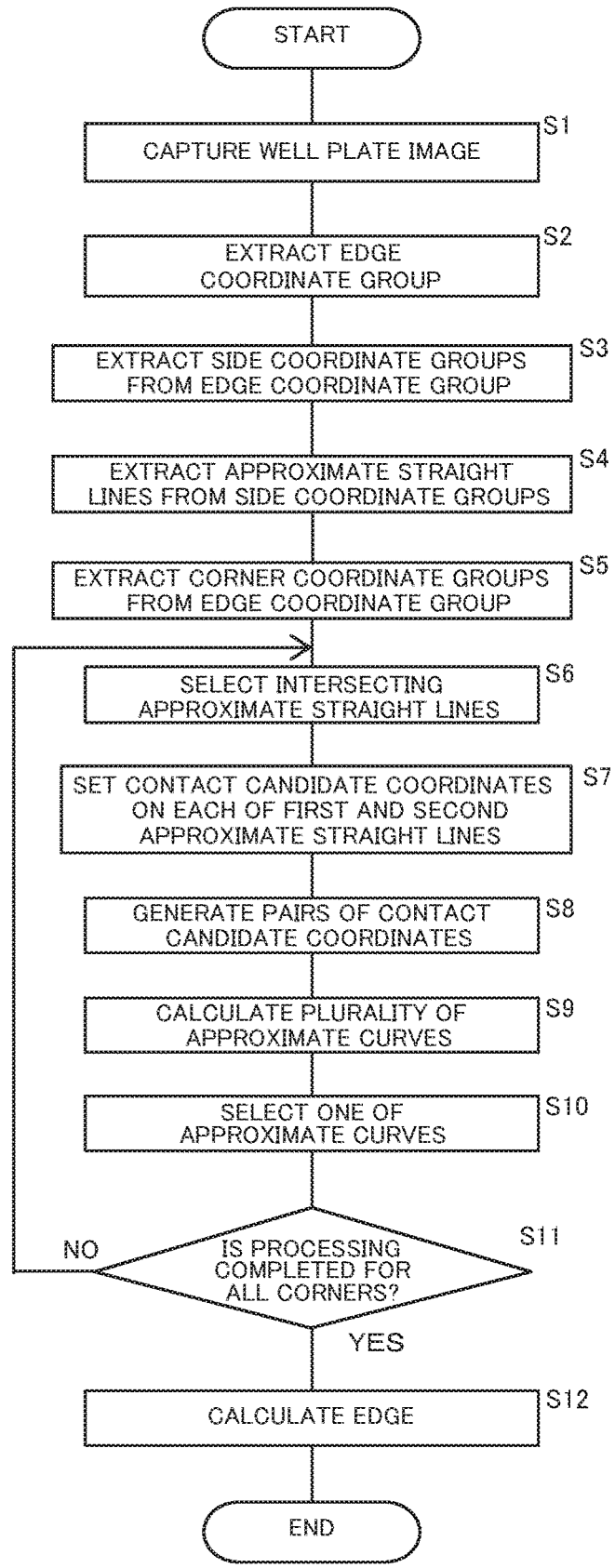
FIG. 4 is a diagram illustrating a flowchart of edge detection processing.

FIG. 4 is a diagram illustrating a flowchart of the edge detection processing. The following description is given with reference to this flowchart.

Figure 5:
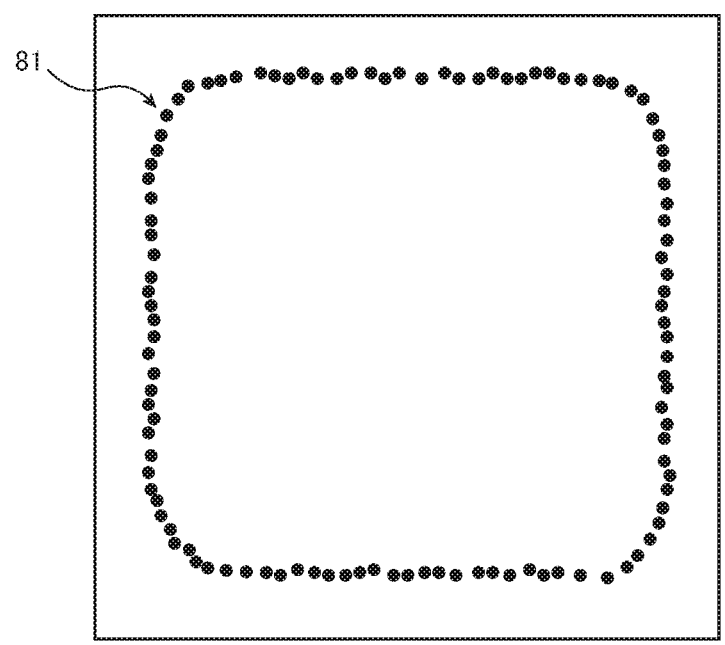
FIG. 5 is a diagram for describing an edge coordinate group.

The controller 60 captures images of the well plate 9 with the camera 40 (step S1). Then, the controller 60 extracts an edge coordinate group for a given well 91 from image data acquired by the image capture (step S2). The edge coordinate group is a group of coordinate data pieces extracted based on a change in the luminance of each pixel in the image data, and it is pixel information for specifying the edge of the well 91. For detection of these edge coordinates, known edge detection processing can be used. FIG. 5 is a diagram for describing an edge coordinate group 81. In FIG. 5, black dots represent pixels specified by each coordinates in the extracted edge coordinate group 81.

In processing in step S2, the coordinates of pixels that are irrelevant to the edge of the well 91 may be extracted due to the influence of, for example, light refraction or the cells 93. Thus, an accurate result may not be obtained even if the edge of the well 91 is detected from the edge coordinate group 81 extracted in step S2. In view of this, the following processing is performed in order to accurately detect the edge of the well 91 from the extracted edge coordinate group 81.

Note that in the case where a plurality of edge coordinate groups 81 is extracted in step S2 due to the influence of, for example, light refraction or the cells 93, processing for narrowing the extracted edge coordinate groups down to one edge coordinate group 81 may be performed by various processes.

Figure 6:
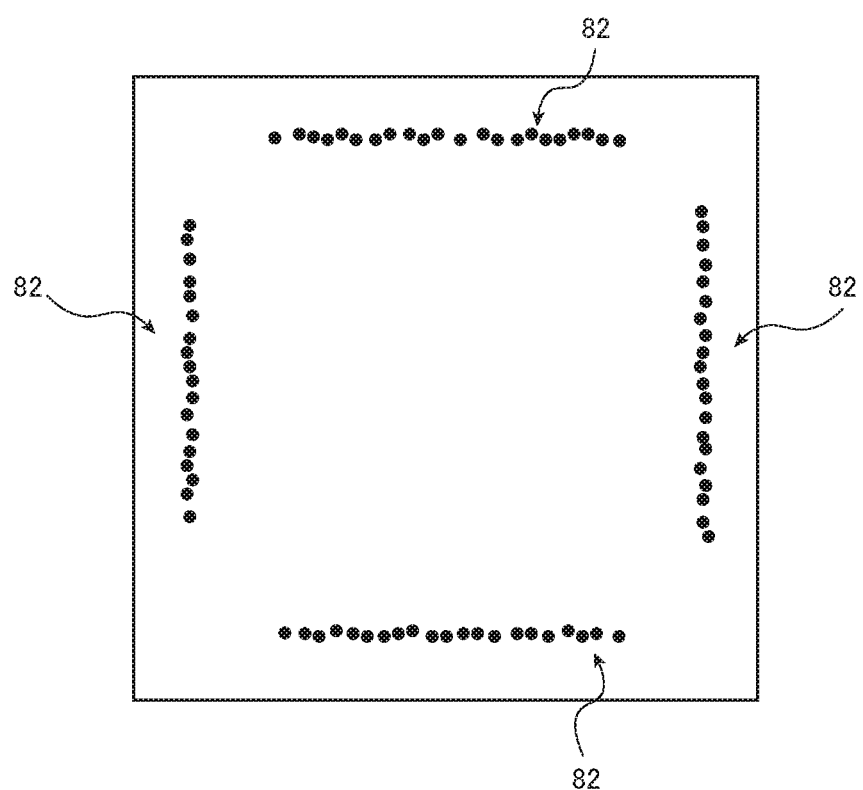
FIG. 6 is a diagram for describing side coordinate groups.

The controller 60 extracts side coordinate groups 82 from the edge coordinate group 81 (step S3). FIG. 6 is a diagram for describing the side coordinate groups 82. As illustrated in FIG. 6, the side coordinate groups 82 are groups of coordinates for specifying the four sides of the well 91, excluding the corners. The controller 60 extracts four side coordinate groups 82 that correspond respectively to the four sides of the well 91.

In step S2, the controller 60 arbitrarily sets central coordinates of a region that has been searched for to extract the edge coordinate group 81. Then, the controller 60 sets regions where each side of the well 91 is presumed to be located, from the set central coordinates and an ideal diameter of the well 91. The ideal diameter of the well 91 is a so-called catalog value and is a design well diameter (length and width dimensions) of the well plate 9 that is set in the image capturing device 1. This ideal diameter is stored in the storage 63. The controller 60 extracts coordinates that are within the set regions as the side coordinate groups 82 from the edge coordinate group 81.

Figure 7:
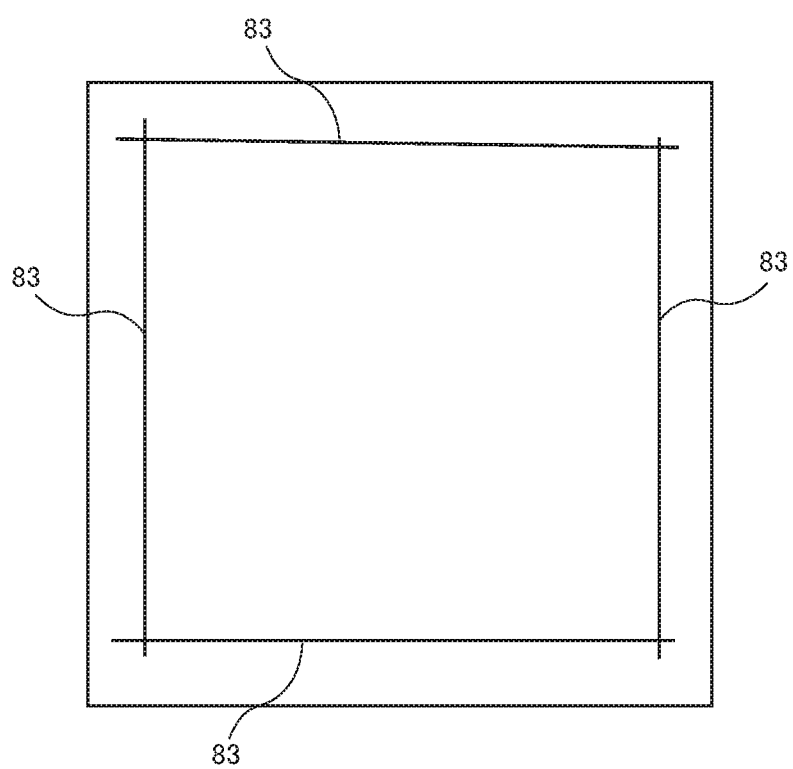
FIG. 7 is a diagram for describing approximate straight lines calculated from the side coordinate groups.

The controller 60 calculates approximate straight lines 83 from the extracted side coordinate groups 82, using a least-square method (step S4). FIG. 7 is a diagram for describing the approximate straight lines 83 calculated from the side coordinate groups 82. One approximate straight line 83 is calculated from one side coordinate group 82. Thus, four approximate straight lines 83 are calculated in the processing in step S4 as illustrated in FIG. 7.

Figure 8:
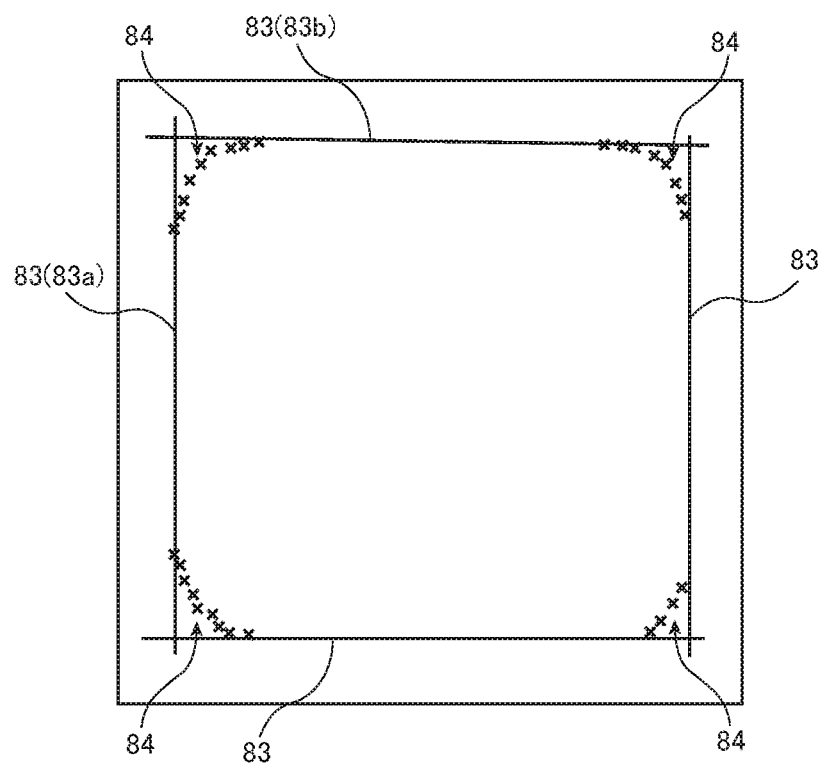
FIG. 8 is a diagram for describing corner coordinate groups.

Then, the controller 60 extracts corner coordinate groups 84 from the edge coordinate group 81 extracted in step S2 (step S5). The corner coordinate groups 84 are groups of coordinates for specifying the corners of the well 91. That is, four corner coordinate groups 84 are extracted in step S5. FIG. 8 is a diagram for describing the corner coordinate groups 84. The approximate straight lines 83 in FIG. 7 are also illustrated in FIG. 8.

For example, the controller 60 assumes an intersection point of two adjacent approximate straight lines 83 among the four approximate straight lines 83 calculated in step S4, as a corner of the well 91. Then, the controller 60 extracts coordinates that are within a predetermined distance from the intersection point as a corner coordinate group 84 from the edge coordinate group 81. That is, the controller 60 extracts the corner coordinate group 84 on the basis of the distance from the intersection point of the two approximate straight lines 83.

Note that the controller 60 may extract the coordinates other than the side coordinate groups 82 extracted in step S3 as the corner coordinate groups 84 from the edge coordinate group 81.

Subsequent processing of steps S6 to S10 is processing for detecting the edge of one of the four corners of the well 91. The controller 60 repeats the processing of steps S6 to S10 in order to detect the edges of the four corners of the well 91.

The controller 60 selects two intersecting approximate straight lines 83 from among the approximate straight lines 83 calculated in step S4 (step S6). Hereinafter, one of the two intersecting approximate straight lines 83 is referred to as a "first approximate straight line 83a" and the other as a "second approximate straight line 83b." The controller 60 sets contact candidate coordinates 85 for each of the first approximate straight line 83a and the second approximate straight line 83b that are in close proximity to the corner coordinate group 84 (step S7). The contact candidate coordinates 85 are coordinates that can be contacts for the curve of the corner of the well 91.

Figure 9:
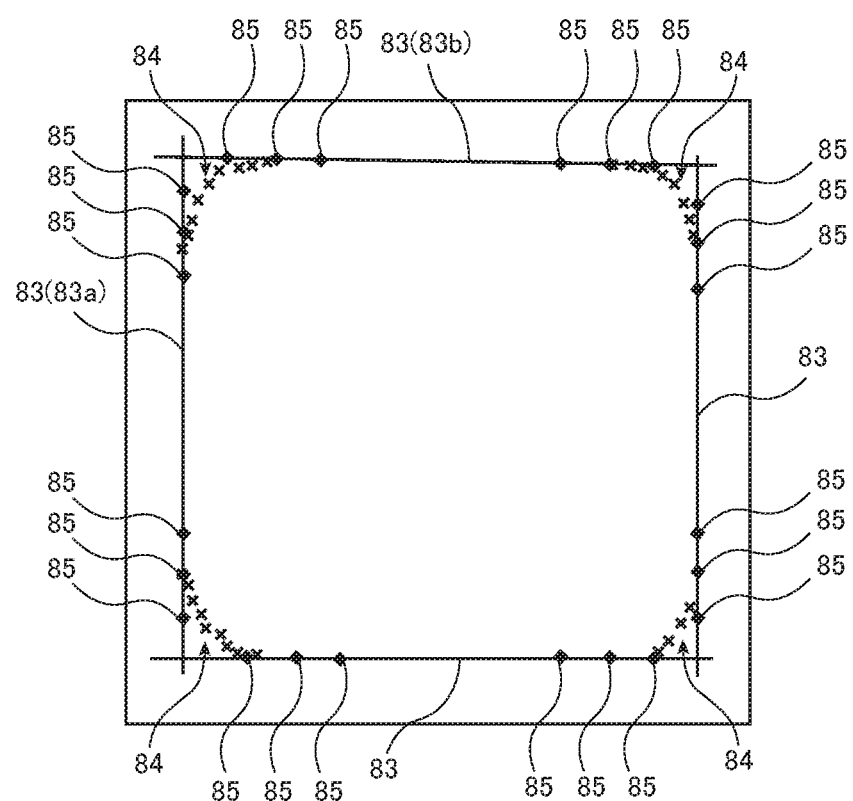
FIG. 9 is a diagram for describing contact candidate coordinates.

FIG. 9 is a diagram for describing the contact candidate coordinates 85. In FIG. 9, black dots represent the contact candidate coordinates 85. FIG. 9 illustrates a state in which the contact candidate coordinates 85 are set on each of the four approximate straight lines 83.

The controller 60 sets a plurality of contact candidate coordinates 85 on the first approximate straight line 83a and the second approximate straight line 83b. The set position and set number of contact candidate coordinates 85 can be appropriately changed. The contact candidate coordinates 85 may be set at equal intervals, or may be set at irregular intervals. FIG. 9 shows an example in which three contact candidate coordinates 85 are set on each of the first approximate straight line 83a and the second approximate straight line 83b, but the number of contact candidate coordinates may be two or four or more.

The controller 60 generates every possible pair of one contact candidate coordinates 85 set on the first approximate straight line 83a and one contact candidate coordinates 85 set on the second approximate straight line 83b (step S8). In the case where three contact candidate coordinates 85 are set on each of the first approximate straight line 83a and the second approximate straight line 83b as illustrated in FIG. 9, the number of pairs to be generated is 9.

The controller 60 calculates an approximate curve that is in contact with the two contact candidate coordinates 85 included in one pair generated in step S8, for all of the pairs generated in step S8 (step S9). The approximate curves are spline curves calculated by polynomial approximation from the corner coordinate groups 84. In the case of FIG. 9, nine approximate curves are calculated for one corner.

The controller 60 selects one approximate curve that matches most in position with the corner coordinate group 84 extracted in step S5 from among the plurality of approximate curves generated in step S9 (step S10). For example, the controller 60 selects an approximate curve that varies least in distance from each coordinates in the corner coordinate group 84.

The controller 60 determines whether the processing of steps S6 to S10 has been performed for all of the corners of the well 91 (step S11). If the above-described processing has not yet been performed for all of the corners (NO in step S11), the controller 60 returns to the processing in step S6, selects two approximate straight lines 83 that have not yet been selected from among the approximate straight lines 83 calculated in step S4, and performs the processing of steps S6 to S10. That is, the controller 60 performs the processing of steps S6 to S10 four times.

If the above-described processing has been performed for all of the corners (YES in step S11), the controller 60 calculates the edge of the well 91 from the four approximate straight lines 83 calculated in step S4 and the four approximate curves selected in step S10 (step S12).

Figure 10:
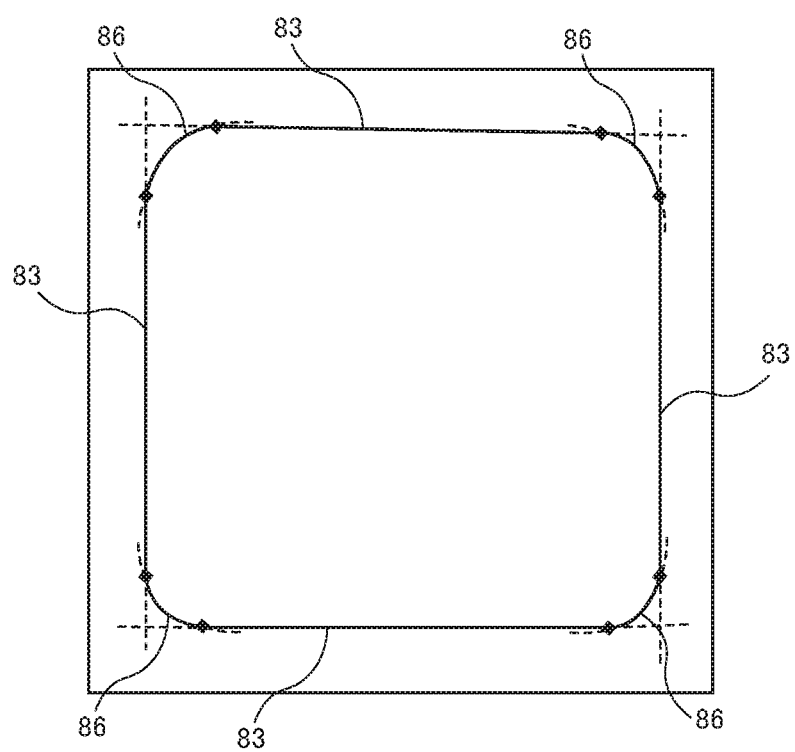
FIG. 10 illustrates a calculation result of the edge of a well.

FIG. 10 illustrates a calculation result of the edge of the well 91. Portions (broken-line portions in FIG. 10) that are outside the intersection points (black dots in FIG. 10) of the approximate straight lines 83 and the approximate curves 86 are eliminated, and the remaining portions are detected as the edge of the well 91.

As described above, according to the present embodiment, the edge of the well 91 is represented by a combination of the approximate straight lines 83 of each side and the approximate curves 86 of each corner. The edge coordinates of the corners to be extracted are likely to vary, as compared with those of the sides, due to the influence of, for example, light refraction. In view of this, the approximate curves 86 of the corners are generated using the approximate straight lines 83 of each side of the rectangle. This increases the accuracy of edge detection at the corners. As a result, the edge of the well 91 can be detected accurately. By grasping the edge of the well 91, it is possible to accurately analyze the cells 93.

The use of polynomial approximation for the generation of edge candidates enables highly robust edge detection. The use of polynomial approximation also enables eliminating edge coordinates that may be detected due to the influence of, for example, the cells 93.

3. Variations

While one embodiment of the present invention has been described above, the present invention is not intended to be limited to the above-described embodiment.

The well 91 may an approximately rectangular shape with long and short sides and four rounded corners when viewed from above. Although each side of the well 91 is described as a straight line, it may be a curve. In this case, the approximate lines of each side calculated by the controller 60 are approximate curves. The approximate curves 86 calculated by the controller 60 are described as spline curves, but the approximate curves 86 may be calculated using known techniques other than that described above.

In the case where the four approximate straight lines 83 are calculated in step S4 in FIG. 4 and if a difference in gradient between two opposing approximate straight lines 83 is greater than or equal to a permissible value, the controller 60 may determine that these two approximate straight lines 83 are abnormal and may stop performing the processing of step S4 onward. Also, in the case where the distance between two opposing approximate straight lines 83 and the distance between the other two approximate straight lines 83 are considerably different from the ideal diameter of the well 91, the controller 60 may stop performing the processing of step S4 onward. In the case of not performing the processing of step S4 onward, the controller 60 may start processing again from step S1, or may stop the edge detection processing. In the case where the ratio of the distance between two opposing approximate straight lines and the distance between the other two approximate straight lines exceeds a permissible value, the processing of step S4 onward may be skipped.

Moreover, among the approximate curves 86 generated in step S9 in FIG. 4, the controller 60 may exclude an approximate curve 86 that is considerably different from an ideal rounded locus, e.g., an approximate curve 86 that does not have a uniform direction, from targets for selection in step S10.

While a least-square method is used for image processing in the above-described embodiment, other known techniques such as Hough transform may be used.

Each element in the above-described embodiments and variations may be combined appropriately within a range that presents no contradictions.

REFERENCE SIGNS LIST

1 Image capturing device
9 Well plate
10 Stage
11 Opening
12 Supporting surface
20 Projector
30 Projector moving mechanism
40 Camera
50 Camera moving mechanism
51 Up-and-down movement mechanism
52 Horizontal movement mechanism
60 Controller
61 Processor
62 Memory
63 Storage
81 Edge coordinate group
82 Side coordinate group
83 Approximate straight line
84 Corner coordinate group
85 Contact candidate coordinates
86 Approximate curve
91 Well
92 Culture solution
93 Cell

The invention claimed is:

1. An image processing method of detecting an edge of an analysis region where an object is analyzed and that has a rectangular shape with rounded corners from image data obtained by capturing an image of the analysis region and surroundings of the analysis region, the method comprising:
   extracting an edge coordinate group for the analysis region from the image data;
   performing processing for extracting, from the edge coordinate group, a side coordinate group that corresponds to one side of the analysis region for each of four sides of the analysis region;
   generating four approximate lines respectively from the four side coordinate groups;
   performing processing for extracting, from the edge coordinate group, a corner coordinate group that corresponds to one corner of the analysis region for each of four corners of the analysis region;
   selecting a first approximate line and a second approximate line that intersect with each other from among the four approximate lines;
   setting a plurality of contact candidate coordinates on each of the first approximate line and the second approximate line;
   generating one or more first approximate curves by polynomial approximation from one of the corner coordinate groups that is closest to an intersection point of the first approximate line and the second approximate line, the one or more first approximate curves being in contact with at least one or more pairs of one contact candidate coordinates set on the first approximate line and one contact candidate coordinates set on the second approximate line; and
   selecting a second approximate curve that is closest to the corner coordinate group used in the generation of the one or more first approximate curves from among the one or more first approximate curves,
   wherein the selecting of the first approximate line and the second approximate line, the setting of the plurality of contact candidate coordinates, the generating of the one or more first approximate curves, and the selecting of the second approximate curve are performed for every possible combination of the four approximate lines.

2. The image processing method according to claim 1, wherein
   in the generating of the one or more first approximate curves, every possible pair of the contact candidate coordinates set in the setting of the plurality of contact candidate coordinates is used to generate the first approximate curves.

3. The image processing method according to claim 1, wherein
   in the processing for extracting the corner coordinate group, the corner coordinate group is extracted based on a distance from an intersection point of two intersecting ones of the approximate lines.

4. The image processing method according to claim 1, wherein
in the generating of the four approximate lines, polynomial approximation using a least-square method is used to generate the approximate lines.

5. The image processing method according to claim 1, wherein
the approximate lines are approximate straight lines.

6. The image processing method according to claim 1, wherein
the one or more first approximate curves are spline curves.

7. An image processor comprising:
a camera that captures an image of an analysis region and surroundings of the analysis region, the analysis region being where an object is analyzed and having a rectangular shape with rounded corners; and
a processing circuitry configured to detect an edge of the analysis region from image data obtained by image capture with the camera,
wherein the processing circuitry is configured to execute:
extracting an edge coordinate group for the analysis region from the image data;
performing processing for extracting, from the edge coordinate group, a side coordinate group that corresponds to one side of the analysis region for each of four sides of the analysis region;
generating four approximate lines respectively from the four side coordinate groups;
performing processing for extracting, from the edge coordinate group, a corner coordinate group that corresponds to one corner of the analysis region for each of four corners of the analysis region;
selecting a first approximate line and a second approximate line that intersect with each other from the four approximate lines;
setting a plurality of contact candidate coordinates each of the first approximate line and the second approximate line;
generating one or more first approximate curves by polynomial approximation from one of the corner coordinate groups that is closest to an intersection point of the first approximate line and the second approximate line, the one or more first approximate curves being in contact with at least one or more pairs of one contact candidate coordinates set on the first approximate line and one contact candidate coordinates set on the second approximate line; and
selecting a second approximate curve that is closest to the corner coordinate group used in the generation of the one or more first approximate curves from among the one or more first approximate curves,
wherein the selecting of the first approximate line and the second approximate line, the setting of the plurality of contact candidate coordinates, the generating of the one or more first approximate curves, and the selecting of the second approximate curve are performed for every possible combination of the four approximate lines.

* * * * *